US012657897B2

(12) United States Patent
Ogawa

(10) Patent No.: US 12,657,897 B2
(45) Date of Patent: Jun. 16, 2026

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Shuhei Ogawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 518 days.

(21) Appl. No.: 18/081,776

(22) Filed: Dec. 15, 2022

(65) Prior Publication Data

US 2023/0196752 A1 Jun. 22, 2023

(30) Foreign Application Priority Data

Dec. 20, 2021 (JP) ................................. 2021-206258

(51) Int. Cl.
| | |
|---|---|
| *G06V 10/82* | (2022.01) |
| *G06N 5/04* | (2023.01) |
| *G06V 10/28* | (2022.01) |
| *G06V 10/77* | (2022.01) |
| *G06V 10/776* | (2022.01) |

(52) U.S. Cl.
CPC .............. *G06V 10/82* (2022.01); *G06N 5/04* (2013.01); *G06V 10/28* (2022.01); *G06V 10/7715* (2022.01); *G06V 10/776* (2022.01)

(58) Field of Classification Search
CPC .... G06V 10/82; G06V 10/7715; G06V 10/28; G06V 10/776; G06N 5/04
See application file for complete search history.

(56) References Cited

U.S. PATENT DOCUMENTS

| | | | | |
|---|---|---|---|---|
| 9,633,045 | B2 * | 4/2017 | Datta | ................... G06V 40/168 |
| 10,140,421 | B1 * | 11/2018 | Bernard | ............... G06V 10/764 |
| 10,565,523 | B2 * | 2/2020 | Luo | ........................ G06Q 10/10 |
| 10,679,330 | B2 * | 6/2020 | Bhatt | ................... G06T 7/0002 |
| 11,282,198 | B2 * | 3/2022 | Lyman | ................... G16H 40/67 |
| 11,288,797 | B2 * | 3/2022 | Gilboa-Solomon | ......................... |
| | | | | G06F 18/217 |
| 11,367,217 | B2 * | 6/2022 | Shu | ........................ G06V 10/82 |

(Continued)

FOREIGN PATENT DOCUMENTS

| | | |
|---|---|---|
| JP | 2010-262576 A | 11/2010 |
| JP | 2014-211855 A | 11/2014 |

(Continued)

OTHER PUBLICATIONS

Liu et al, "Deep Learning Face Attributes in the Wild" (pp. 1-11). (Year: 2015).*

(Continued)

*Primary Examiner* — Manav Seth

(74) *Attorney, Agent, or Firm* — Carter, DeLuca & Farrell LLP

(57) ABSTRACT

An information processing apparatus comprises a first inference unit configured to infer an attribute of an object in an input image, and a weight relating to the attribute of each region in the input image, and a second inference unit configured to infer an attribute of the object, based on an attribute and a weight that are inferred by the first inference unit.

16 Claims, 11 Drawing Sheets

(56) References Cited

U.S. PATENT DOCUMENTS

| | | | | |
|---|---|---|---|---|
| 11,574,187 | B2 * | 2/2023 | Feng | G06V 40/103 |
| 12,020,474 | B2 * | 6/2024 | Tate | G06T 7/143 |
| 12,136,250 | B2 * | 11/2024 | Pham | G06V 10/751 |
| 2019/0050681 | A1 * | 2/2019 | Tate | G06V 40/161 |
| 2019/0095764 | A1 * | 3/2019 | Li | G06F 18/24133 |
| 2019/0147221 | A1 * | 5/2019 | Grabner | G06T 7/75 |
| | | | | 382/103 |
| 2019/0220967 | A1 * | 7/2019 | Bhatt | G06T 7/0002 |
| 2021/0287046 | A1 * | 9/2021 | Okuno | G06N 5/04 |
| 2023/0237821 | A1 * | 7/2023 | Jeong | G06V 20/70 |
| | | | | 382/195 |
| 2024/0296669 | A1 * | 9/2024 | Tate | G06V 40/103 |
| 2024/0404268 | A1 * | 12/2024 | Lin | G06V 10/82 |
| 2025/0022252 | A1 * | 1/2025 | Pham | G06N 3/08 |
| 2025/0249599 | A1 * | 8/2025 | Cristache | B25J 13/06 |

FOREIGN PATENT DOCUMENTS

| | | | |
|---|---|---|---|
| JP | 2017-045331 A | | 3/2017 |
| JP | 2020-035098 A | | 3/2020 |
| JP | 2021-529400 A | | 10/2021 |
| JP | 2021526683 A | | 10/2021 |
| WO | 2021/249006 A1 | | 12/2021 |
| WO | WO-2022070937 A1 * | 4/2022 | G06N 3/084 |

OTHER PUBLICATIONS

Zhang et al., "Progressive Neural Networks for Image Classification" (pp. 1-16) (Year: 2018).*

Sarfaraz et al., "Deep View-Sensitive Pedestrian Attribute Inference in an end-to-end Model" (pp. 1-13) (Year: 2017).*

Ding et al., "A Deep Cascade Network for Unaligned Face Attribute Classification" (pp. 6789-6796) (Year: 2018).*

Zhuang et al, "Multi-task Learning of Cascaded CNN for Facial Attribute Classification" (pp. 2069-2074) (Year: 2018).*

Wu et al., "Person Attribute Recognition by Sequence Contextual Relation Learning" (pp. 3398-3412) (Year: 2020).*

Hu, H. et al,"Relation Network for Object Detection" The IEEE Conference on Computer Vision and Pattern Recognition (Jun. 2018) pp. 1-10.

Solovyev, R. et al,"Weighted Boxes Fusion: combining boxes for object detection models" arXiv:1910.13302v2 (Aug. 2020) pp. 1-9.

Notice of Reasons for Refusal issued by the Japanese Patent Office on Sep. 5, 2025 in corresponding JP Patent Application No. 2021-206258, with English translation.

Notice of Reasons for Refusal issued by the Japanese Patent Office on Feb. 13, 2026 in corresponding JP Patent Application No. 2021-206258, with English translation.

* cited by examiner

701

702

703

INPUT IMAGE 705 704 706

GT MAP
(CENTER)

708 707

GT MAP
(OBJECT SIZE)

710 709

GT MAP
(CATEGORY: PERSON)

711 712

GT MAP
(CATEGORY: DOG)

713

INFERENCE MAP
(CENTER)

716 715

INFERENCE MAP
(OBJECT SIZE)

717

INFERENCE MAP
(CATEGORY: PERSON)

718

INFERENCE MAP
(CATEGORY: DOG)

F I G. 7J
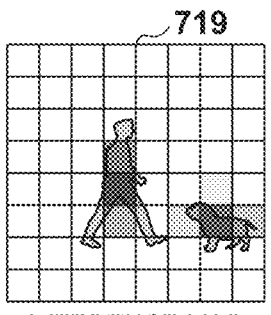
719
INFERENCE MAP
(ENSEMBLE WEIGHT FOR SIZE)
F I G. 7K
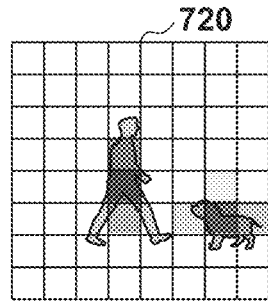
720
INFERENCE MAP
(ENSEMBLE WEIGHT FOR CATEGORY)
F I G. 8
2
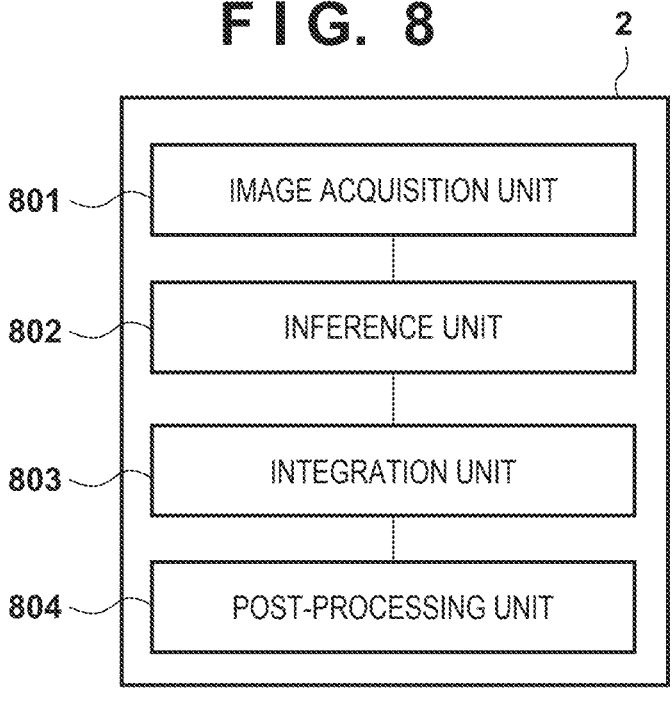
801 — IMAGE ACQUISITION UNIT
802 — INFERENCE UNIT
803 — INTEGRATION UNIT
804 — POST-PROCESSING UNIT

F I G. 9
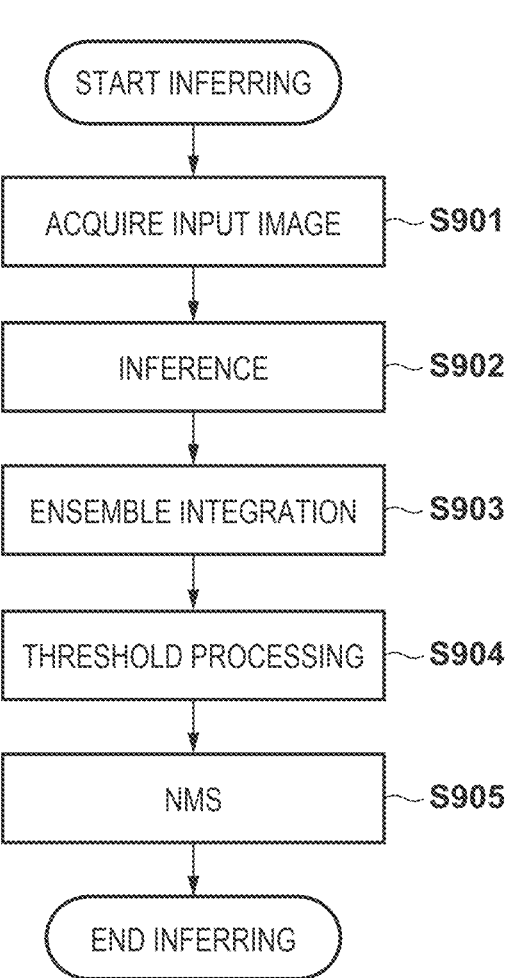

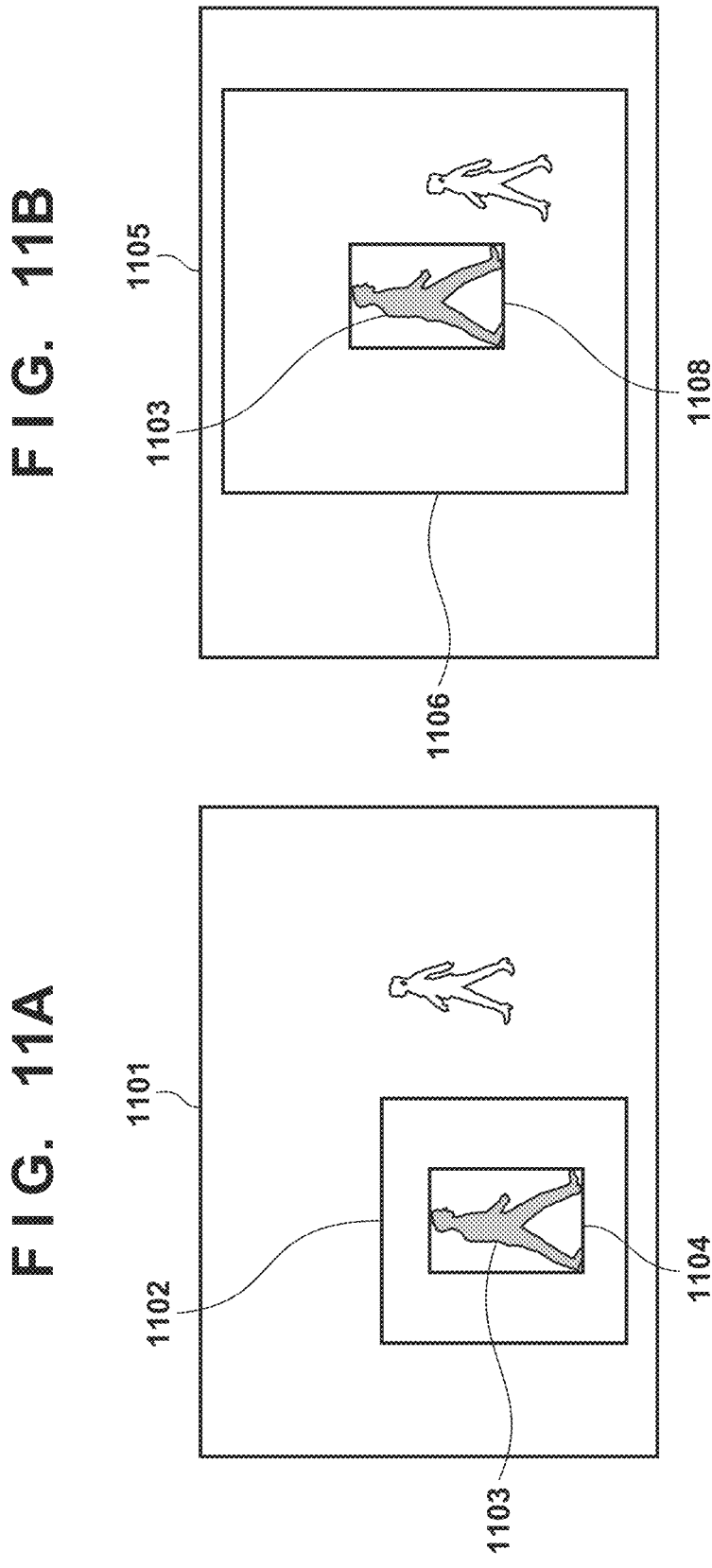
F I G. 11A
F I G. 11B

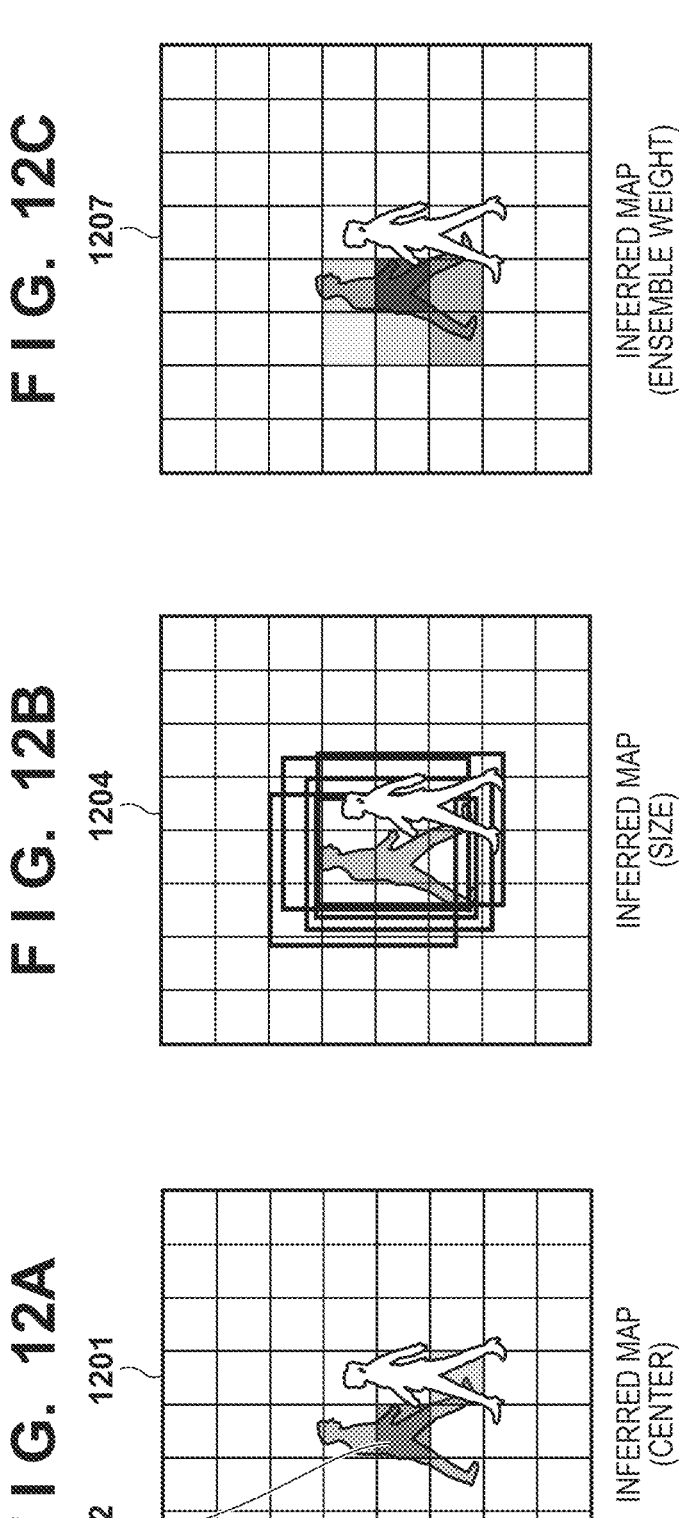
F I G.  12A
1201
1202
INFERRED MAP
(CENTER)
F I G.  12B
1204
INFERRED MAP
(SIZE)
F I G.  12C
1207
INFERRED MAP
(ENSEMBLE WEIGHT)

F I G. 13
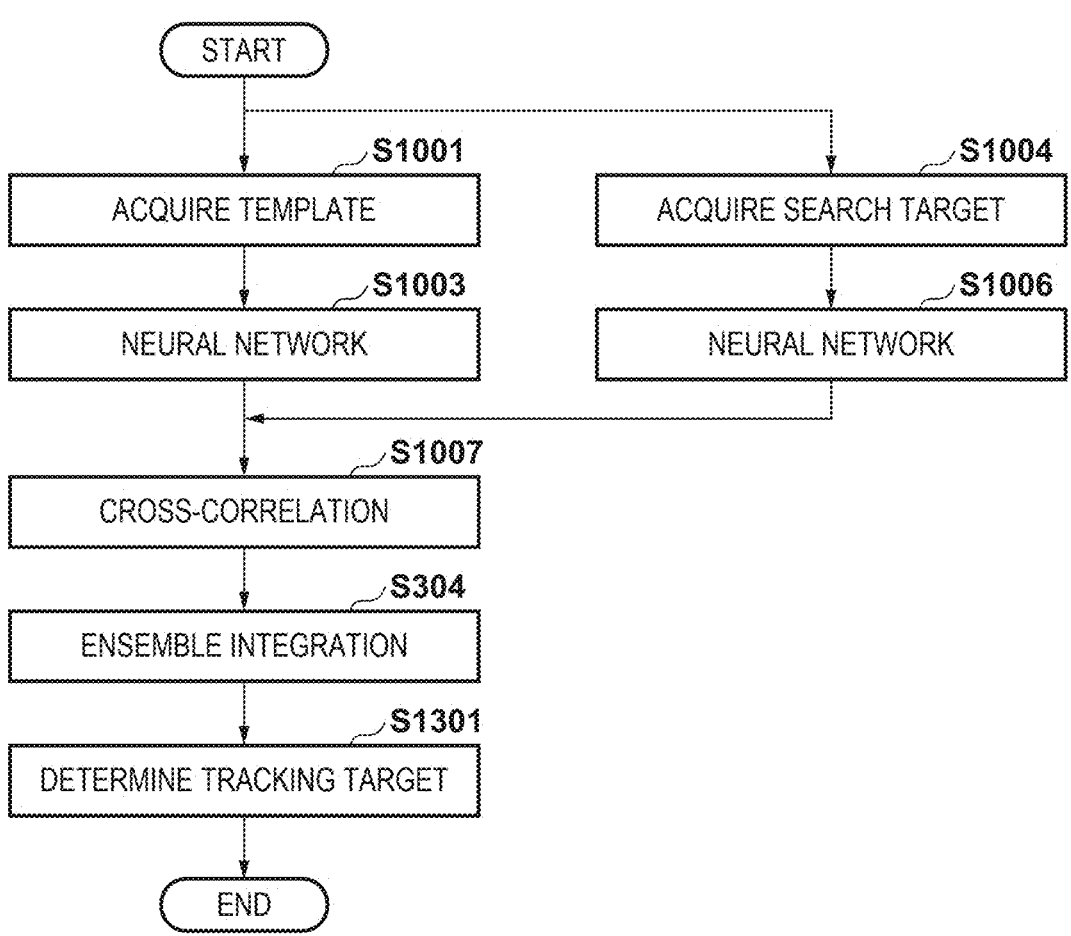

F I G. 14A
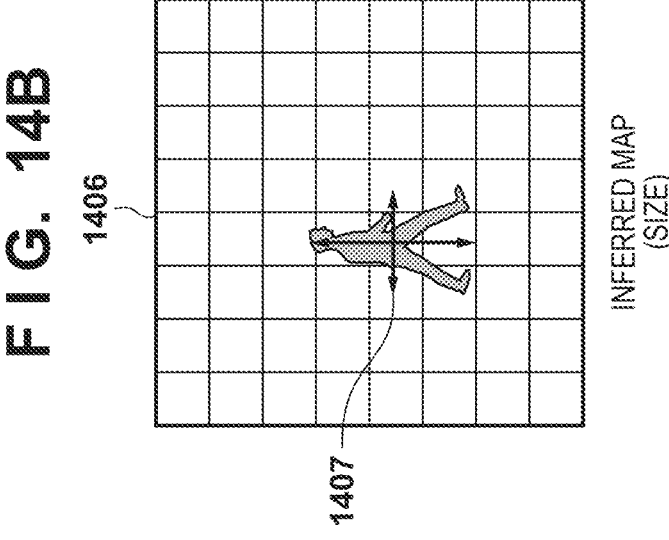
GT MAP
(OBJECT SIZE)
F I G. 14B
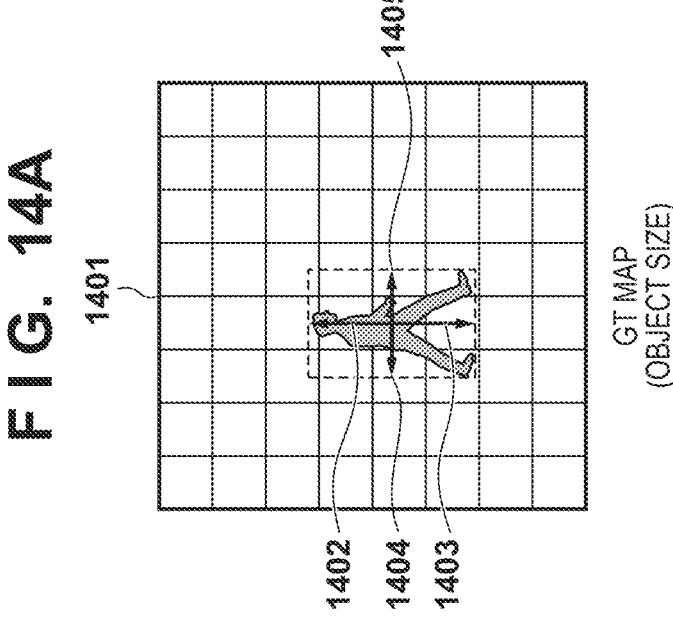
INFERRED MAP
(SIZE)

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to technology for inferring an attribute of an object in an image.

Description of the Related Art

In recent years, machine learning technology represented by Deep Learning has rapidly developed in the field of image recognition, voice recognition, and then machine translation. Among them, object detection using Deep Learning has particularly been applied to a variety of scenes such as a surveillance camera, medical image recognition, and automatic operation, and has become an important task.

An example of an approach for improving performance of object detection includes obtaining an ensemble of a plurality of results. For instance, in Random Forest, a plurality of decision trees are prepared, and an ensemble of results predicted by respective decision trees to obtain a final result, and accordingly, performance can be improved while over-training of each decision tree is suppressed. The concept of this ensemble can also be applied to Deep Learning. For instance, according to Solovyev, et al., "Weighted Boxes Fusion: combining boxes for object detection models," a single image is input to a plurality of different neural networks to obtain a plurality of object detection frames. Then, coordinate values of the plurality of object detection frames obtained are weighted by reliability of object detection to obtain an ensemble, and object detection performance is improved.

On the other hand, since such an approach using a plurality of neural networks increases computational complexity as the number of models increases, such an approach is difficult to apply to a task that requires real-time capability. According to Han Hu, et al., "Relation Network for Object Detection," The IEEE Conference on Computer Vision and Pattern Recognition 2018, relationship among a plurality of object detection candidate frames inferred by a neural network from a single image is learned by using attention. An ensemble of the plurality of object detection candidate frames estimated is obtained based on attention, and accordingly, object detection performance is improved. Instead of using a plurality of neural networks to obtain an ensemble, an ensemble of the plurality of object detection candidates obtained from a single neural network is obtained, and accordingly, performance is improved while a slow-down process is suppressed.

According to the approach described in Han Hu, et al., "Relation Network for Object Detection," The IEEE Conference on Computer Vision and Pattern Recognition 2018, weighting with respect to the object detection candidates is learned as attention. That is, to perform the weighting, it is necessary to extract the object detection candidates once, and performance of the ensemble varies depending on the number of detected candidates. When only one candidate is detected, it is difficult to obtain the ensemble.

SUMMARY OF THE INVENTION

The present invention provides technology for stably obtaining a detection result without depending on the number of detected candidates.

According to the first aspect of the present invention, there is provided an information processing apparatus comprising: a first inference unit configured to infer an attribute of an object in an input image, and a weight relating to the attribute of each region in the input image; and a second inference unit configured to infer an attribute of the object, based on an attribute and a weight that are inferred by the first inference unit.

According to the second aspect of the present invention, there is provided an information processing apparatus comprising: an acquisition unit configured to acquire, as an output of a neural network having received an input image, an attribute of an object in the input image, and a weight relating to the attribute of each region in the input image; and an updating unit configured to update a parameter of the neural network, based on an attribute and a weight that are acquired by the acquisition unit and based on supervised data.

According to the third aspect of the present invention, there is provided an information processing method comprising: inferencing an attribute of an object in an input image, and a weight relating to the attribute of each region in the input image; and inferring an attribute of the object, based on the attribute and the weight that are inferred.

According to the fourth aspect of the present invention, there is provided an information processing method comprising: acquiring, as an output of a neural network having received an input image, an attribute of an object in the input image, and a weight relating to the attribute of each region in the input image; and updating a parameter of the neural network, based on the attribute and the weight that are acquired and based on supervised data.

According to the fifth aspect of the present invention, there is provided a non-transitory computer-readable storage medium storing a computer program for causing a computer to function as: a first inference unit configured to infer an attribute of an object in an input image, and a weight relating to the attribute of each region in the input image; and a second inference unit configured to infer an attribute of the object, based on an attribute and a weight that are inferred by the first inference unit.

According to the sixth aspect of the present invention, there is provided a non-transitory computer-readable storage medium storing a computer program for causing a computer to function as: an acquisition unit configured to acquire, as an output of a neural network having received an input image, an attribute of an object in the input image, and a weight relating to the attribute of each region in the input image; and an updating unit configured to update a parameter of the neural network, based on an attribute and a weight that are acquired by the acquisition unit and based on supervised data.

Further features of the present invention will become apparent from the following description of exemplary embodiments with reference to the attached drawings.

BRIEF DESCRIPTION OF THE DRAWINGS

FIGS. 7A to 7K each illustrate an example of an input image and a map group.

FIG. 8 is a block diagram illustrating a functional configuration example of an information processing apparatus 2.

FIG. 9 is a flowchart of processing to be performed by the information processing apparatus 2.

FIG. 11A illustrates an example of a template image.

FIG. 11B illustrates an example of a search image.

FIGS. 12A to 12C each illustrate an example of a map based on a cross-correlation.

FIG. 13 is a flowchart of processing to be performed by the information processing apparatus 2.

FIG. 14A illustrates a configuration example of a map 1401.

FIG. 14B illustrates a configuration example of a map 1406.

DESCRIPTION OF THE EMBODIMENTS

Figure 1:
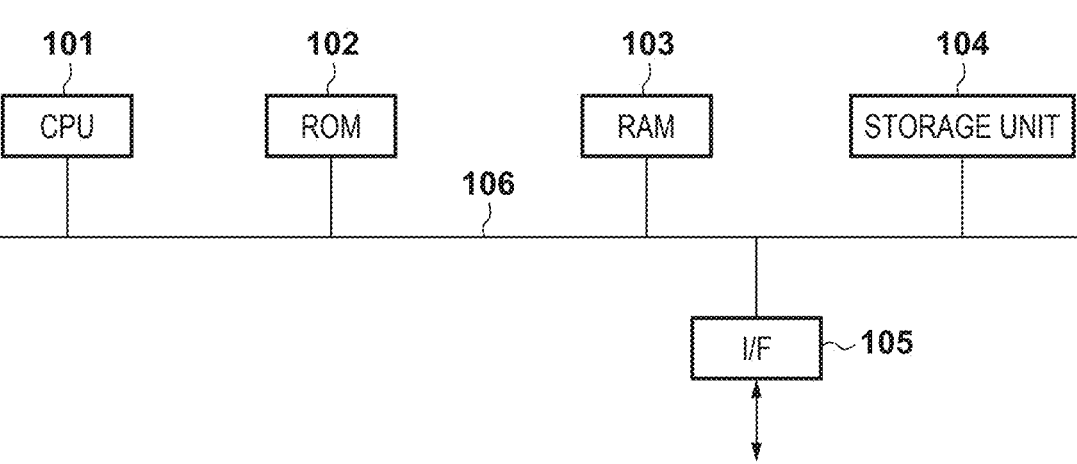
FIG. 1 is a block diagram illustrating a hardware configuration example of an information processing apparatus 1.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, the case of executing a task of inferring an "attribute of an object" such as a position and size of an object in an input image will be explained. First, a hardware configuration example of an information processing apparatus 1 that performs learning of a neural network that realizes such a task will be explained with reference to a block diagram of FIG. 1.

A CPU 101 executes various kinds of processing by using a computer program and data stored in a ROM 102 or a RAM 103. Accordingly, the CPU 101 entirely performs operation control of the information processing apparatus 1, and also executes or controls various kinds of processing explained as processing to be performed by the information processing apparatus 1.

In the ROM 102, setting data of the information processing apparatus 1, a computer program and data relating to activation of the information processing apparatus 1, a computer program and data relating to a basic operation of the information processing apparatus 1, and the like are stored.

The RAM 103 has an area for storing a computer program and data loaded from the ROM 102 or a storage unit 104, and a work area to be used when the CPU 101 executes various kinds of processing. Further, the RAM 103 has an area for storing data externally received via an I/F 105. In this way, the RAM 103 can provide various areas as appropriate.

The storage unit 104 is a large-capacity information storage device such as a hard disk drive, a flash memory, and various optical media. In the storage unit 104, an operating system (OS), a computer program and data for causing the CPU 101 to execute or control various kinds of processing explained as processing to be performed by the information processing apparatus 1, and the like are saved. The computer program and data saved in the storage unit 104 are loaded to the RAM 103 as appropriate according to control by the CPU 101, and are a computer program and data to be processed by the CPU 101.

The I/F 105 functions as a communication interface for performing data communication with an external apparatus via a wired and/or wireless network such as a LAN and the Internet.

The CPU 101, the ROM 102, the RAM 103, the storage unit 104, and the I/F 105 are all connected to a system bus 106. Note that the configuration illustrated in FIG. 1 is an example of the hardware configuration applicable to the information processing apparatus 1, and can be changed or modified as appropriate.

Figure 2:
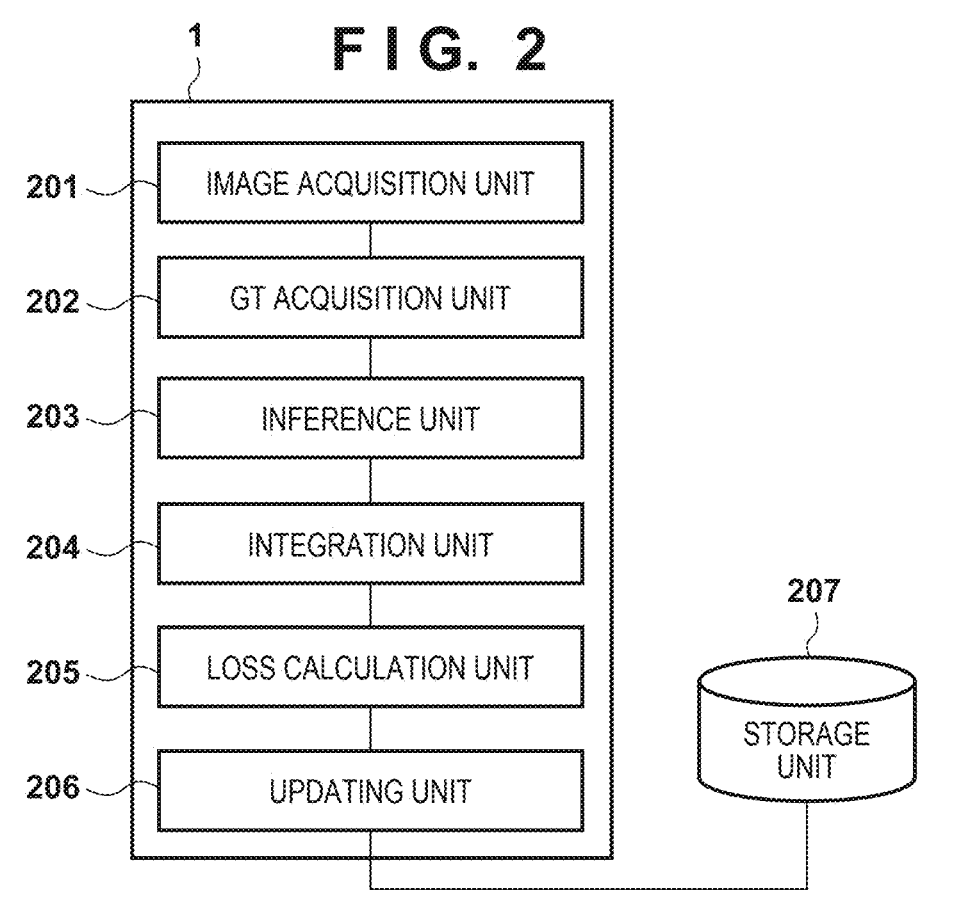
FIG. 2 is a block diagram illustrating a functional configuration example of the information processing apparatus 1.

A functional configuration example of the information processing apparatus 1 is illustrated in FIG. 2. In the present embodiment, it is assumed that each functional unit of FIG. 2 is implemented by software (computer program). Although the functional units of FIG. 2 may be explained below as main units of processing, functions of the functional units are actually realized by the CPU 101 executing computer programs corresponding to the functional units. Note that the functional units illustrated in FIG. 2 may be implemented by hardware.

Figure 3:
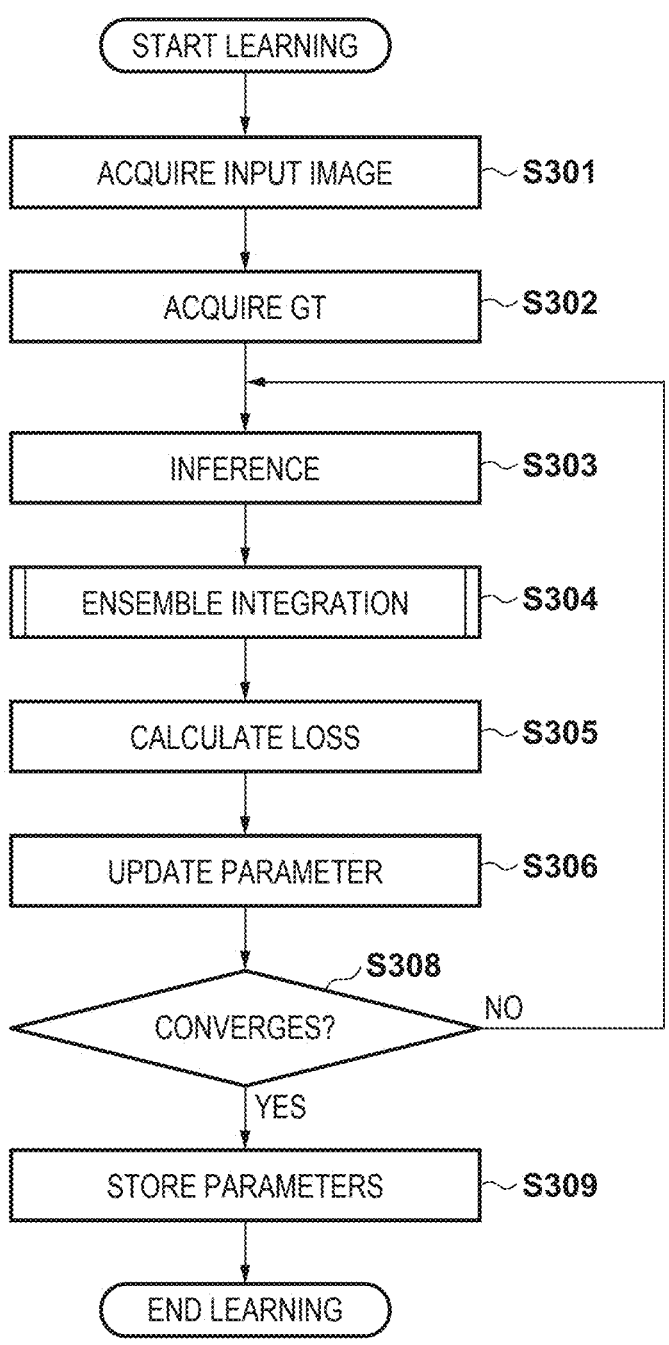
FIG. 3 is a flowchart of processing to be performed by the information processing apparatus 1.

"Learning of a neural network that infers, from an input image, a position and a size of an object as an attribute of the object" that is performed by such an information processing apparatus 1 will be explained with reference to a flowchart of FIG. 3.

At step S301, an image acquisition unit 201 acquires an input image including an object to be detected. In the present embodiment, it is assumed that the object to be detected includes a person and a dog, but the object to be detected is not limited thereto. In addition, a method of acquiring an input image is not limited to a specific acquisition method. For instance, the image acquisition unit 201 may acquire a single image as an input image from a group of images saved in the storage unit 104, or may acquire, as an input image via the I/F 105, an image captured by an image capturing apparatus. In addition, the image acquisition unit 201 may acquire, as an input image via the I/F 105, a single image from a group of images saved in an external apparatus such as a server apparatus.

Figure 7A:
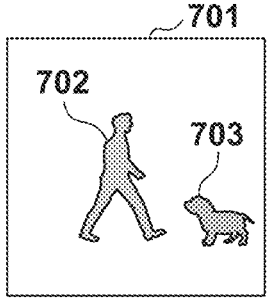

To provide specific explanation below, the case where the image acquisition unit 201 has acquired an input image 701 illustrated in FIG. 7A at step S301 will be explained. The input image 701 includes a person 702 and a dog 703 as objects to be detected.

At step S302, a GT acquisition unit 202 acquires Ground Truth (referred to below as GT) that is supervised data of the person 702 and the dog 703 included in the input image 701 acquired by the image acquisition unit 201. As with the method of acquiring an input image, a method of acquiring GT is not limited to a specific acquisition method, and GT may be acquired from the storage unit 104, or may be acquired from an external apparatus via the I/F 105.

Figure 7B:
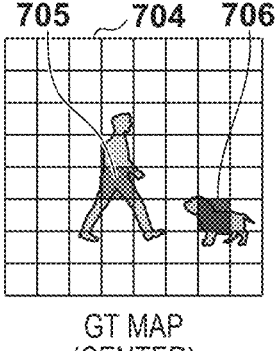

For instance, the GT acquisition unit 202 acquires a GT map 704 of FIG. 7B as GT indicating center positions of the person 702 and the dog 703 included in the input image 701 acquired by the image acquisition unit 201. Each element (each rectangle of FIG. 7B) in the GT map 704 corresponds to each pixel or each image region (one image region is constituted by two or more pixels) in the input image 701. An element 705 is an element corresponding to the center position of the person 702 in the input image 701, and an element 706 is an element corresponding to the center position of the dog 703 in the input image 701. A value of each of the elements 705, 706 among the elements in the GT map 704 is "1," and a value of each of other elements than the elements 705, 706 is "0."

Figure 7C:
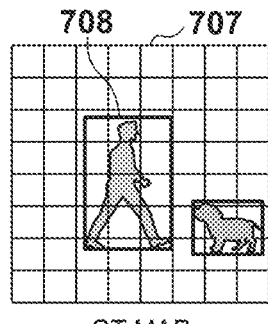

In addition, for instance, the GT acquisition unit 202 acquires a GT map 707 of FIG. 7C as GT indicating sizes of the person 702 and the dog 703 included in the input image 701 acquired by the image acquisition unit 201. Each element (each rectangle of FIG. 7C) in the GT map 707 corresponds to each pixel or each image region in the input image 701. A value of an element positionally corresponding to the above-described element 705 in the GT map 707 is the size (height and width) of the person 702, and a frame 708 represents that size. In addition, a value of an element positionally corresponding to the above-described element 706 in the GT map 707 is the size (height and width) of the dog 703.

Note that in a case where an element in a map has a plurality of values, for instance, two values of height and width, the map may be constituted by a map of the element having the value of the height and a map of the element having the value of the width.

Figure 7D:
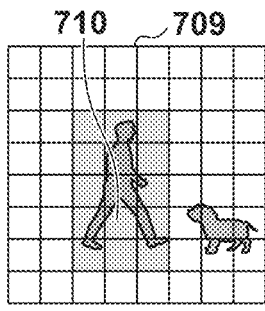

In addition, for instance, the GT acquisition unit 202 acquires a GT map 709 of FIG. 7D as GT representing a category of the person 702 included in the input image 701 acquired by the image acquisition unit 201. Each element (each rectangle of FIG. 7D) in the GT map 709 corresponds to each pixel or each image region in the input image 701. In the GT map 709, a value of each of elements belonging to a region 710 in the frame 708 according to the size of the person 702 is "1," and a value of each of elements not belonging to the region 710 is "0."

Figure 7E:
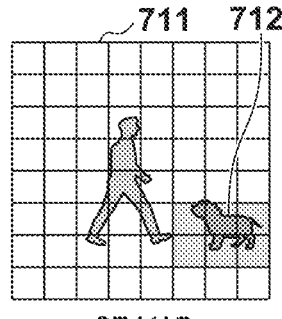

In addition, for instance, the GT acquisition unit 202 acquires a GT map 711 of FIG. 7E as GT representing a category of the dog 703 included in the input image 701 acquired by the image acquisition unit 201. Each element (each rectangle of FIG. 7E) in the GT map 711 corresponds to each pixel or each image region in the input image 701. In the GT map 711, a value of each of elements belonging to a region 712 in a frame according to the size of the dog 703 is "1," and a value of each of elements not belonging to the region 712 is "0."

At step S303, an inference unit 203 inputs the input image 701 to a neural network and performs operation processing of the neural network. Accordingly, the inference unit 203 acquires inference maps exemplified in FIGS. 7F, 7G, 7H, 7I, 7J and 7K, as an inference result relating to an object to be detected. Each element in each of these inference maps (each rectangle in each of FIGS. 7F, 7G, 7H, 7I, 7J and 7K) corresponds to each pixel or each image region in the input image 701.

Figure 4:
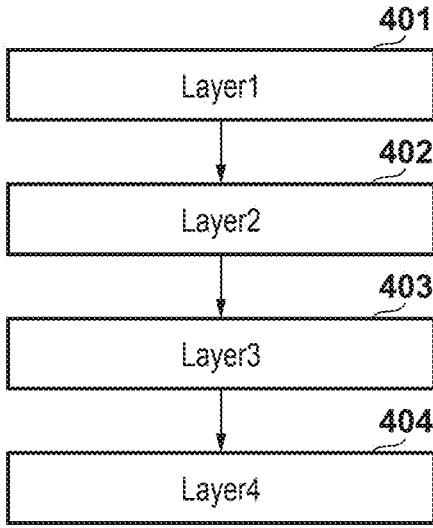
FIG. 4 illustrates a configuration example of a neural network.
Figure 5:
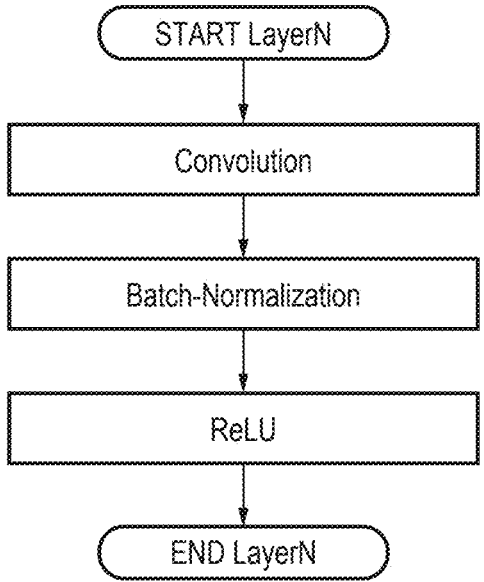
FIG. 5 illustrates a configuration example of each Layer.

A configuration example of the neural network used by the inference unit 203 will be explained with reference to FIG. 4. A neural network of FIG. 4 is a hierarchical neural network having four layers of Layer 1 (401), Layer 2 (402), Layer 3 (403) and Layer 4 (404). As illustrated in FIG. 5, each Layer has Convolution, Batch-Normalization, and Rectified Linear Unit (referred to below as ReLU). The configuration of FIG. 5 is merely an example, and instead of ReLU, Leaky ReLU, a Sigmoid function, or the like may be used, or Max Pooling or Average Pooling may be combined.

Figure 7F:
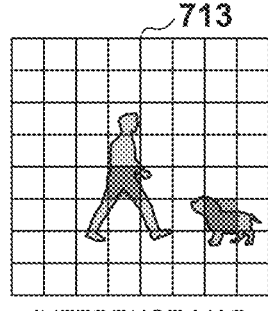

A map 713 of FIG. 7F is an inference map obtained as an output of a neural network with respect to the input image 701, and a value (inference value) of each element in the map 713 indicates a likelihood that the element correspond to the center position of the object. In the map 713, as the learning of the neural network proceeds, a value of an element corresponding to the center position of the object approaches to 1, and a value of each of elements other than that element approaches to 0.

Figure 7G:
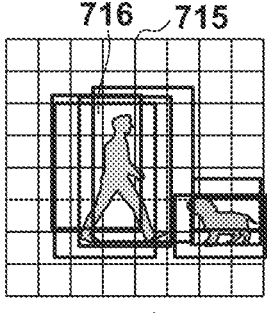

A map 715 of FIG. 7G is an inference map obtained as an output of the neural network with respect to the input image 701, and a value of each element in the map 715 indicates an inference value of the size of the object that is inferred with respect to the element. FIG. 7G illustrates a frame of the size indicated by the value (the inference value of the size) of each element. The inference value obtained in each element varies in accordance with the size of the object corresponding to the element.

Figure 7H:
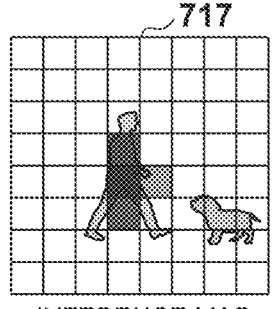

A map 717 of FIG. 7H is an inference map obtained as an output of the neural network with respect to the input image 701, and a value of each element in the map 717 indicates a likelihood that the element be an "element belonging to a region of the object categorized as the "person"."

Figure 7I:
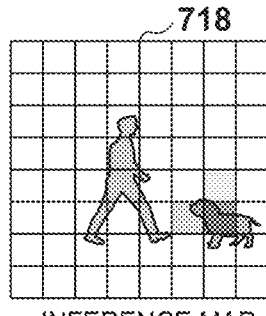

A map 718 of FIG. 7I is an inference map obtained as an output of the neural network with respect to the input image 701, and a value of each element in the map 718 indicates a likelihood that the element be an "element belonging to a region of the object categorized as the "dog"."

A map 719 of FIG. 7J is an inference map (weighting map) obtained as an output of the neural network having received the input image 701, and a value of each element in the map 719 indicates a weight with respect to the size of the object corresponding to the element.

A map 720 of FIG. 7K is an inference map (weighting map) obtained as an output of the neural network having received the input image 701, and a value of each element in the map 720 indicates a weight with respect to the category of the object corresponding to the element.

Figure 6A:
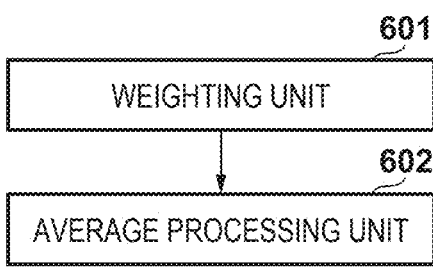
FIG. 6A is a block diagram illustrating a functional configuration example of an integration unit 204.
Figure 6B:
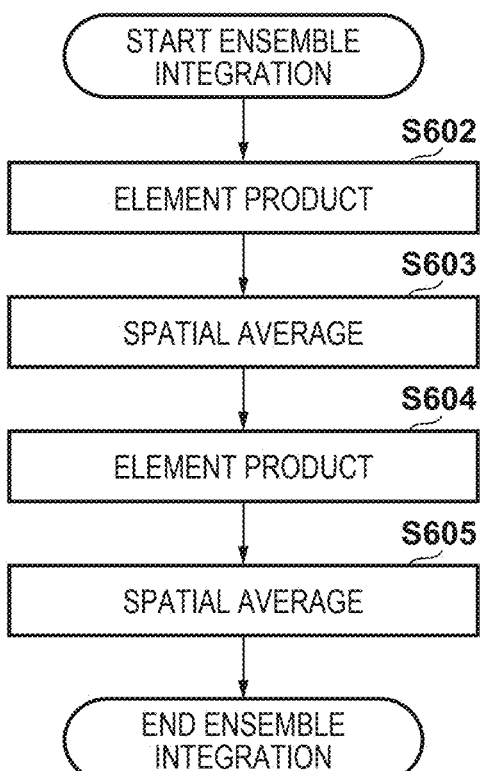
FIG. 6B is a flowchart illustrating details of processing at step S304.

At step S304, an integration unit 204 performs ensemble integration, based on the maps 715, 717, 718, 719, 720. A functional configuration example of the integration unit 204 is illustrated in FIG. 6A. Details of processing at step S304 will be explained with reference to a flowchart of FIG. 6B. Although the processing relating to the person will be explained below, the processing is similarly performed with respect to the dog. At step S602, a weighting unit 601 calculates an element product of: the map 715; and the map 719, according to Equation 1 described below to acquire a map S'.

$$S'=S \cdot A_S \qquad \text{(Equation 1)}$$

Here, S represents the map 715, $A_S$ represents the map 719, and represents the element product. At step S603, an average processing unit 602 performs spatial average processing of averaging respective regions in the map S' in a spatial direction according to Equation 2 described below.

$$S_A=\text{SpatialAverage}\,(S') \qquad \text{(Equation 2)}$$

Here, SpatialAverage (X) is a function of averaging, with respect to each element in a map X, an element group including the element and elements on a periphery of that element, and SpatialAverage (S') is defined by Equation 2-1 described below.

$$S_A^i = \frac{1}{N} \sum_{j \in Peripheral_i} S'_j \qquad \text{(Equation 2-1)}$$

Here, $S_A^i$ represents a value of an i-th element in a map $S_A$, and S'j represents a value of a j-th element in the map S'. In addition, "j $\in$ Peripheral$_i$" represents an index j of N elements including the i-th element and elements on a periphery of the i-th element. That is, $S_A^i$ is an average (spatial average) value of values of the N elements including the i-th element and the elements on a periphery of the i-th element in the map S'. N is the number of elements of which a spatial average is calculated, and is empirically determined in advance. At step S604, the weighting unit 601 calculates an element product of: the map 717; and the map 720, according to Equation 3 described below, and acquires a map O'.

$$O' = O \cdot A_O \qquad \text{(Equation 3)}$$

Here, O represents the map 717, and Ao represents the map 720. At step S605, the average processing unit 602 performs spatial average processing of averaging the map O' in the spatial direction according to Equation 4 described below.

$$O_A = \text{SpatialAverage } (O') \qquad \text{(Equation 4)}$$

Accordingly, $O_A^i$ (a value of an i-th element in a map OA) becomes an average (spatial average) value of values of N elements including the i-th element and elements on a periphery of the i-th element in the map O'.

Then, the integration unit 204 outputs the map 713 as a final inference result of the center position of the object in the input image, outputs the map $S_A$ as a final inference result of the size of the object in the input image, and outputs the map $O_A$ as a final inference result of the category of the object in the input image.

Returning to FIG. 3, next, at step S305, a loss calculation unit 205 determines a loss based on a difference between the inference result outputs by the integration unit 204 and the GT maps acquired at step S302. In the present embodiment, a loss based on a difference between each of the inference results of the position of the object, the size of the object, and the category of the object and the corresponding GT map is determined.

First, processing of determining a loss with respect to the position of the object will be explained. The neural network in the present embodiment learns a task of object detection. Therefore, it is necessary that learning enable the neural network to correctly detect the position of the object.

Then, the loss calculation unit 205 performs learning of the neural network such that the map 713 that is the output of the neural network with respect to the input image 701 approaches to the corresponding GT map 704. When the output (map 713) of the Layer 4 (404) in the neural network having received the input image 701 is assumed to be Cinf, and the GT map 704 is assumed to be Cgt, a loss Loss$_C$ with respect to the position of the object can be determined according to Equation 5 described below.

$$\text{Loss}_C = \frac{1}{N} \sum (C_{inf} - C_{gt})^2 \qquad \text{(Equation 5)}$$

$\Sigma$ represents determining a total with respect to all elements of Cinf (Cgt), and N represents the number of the elements in Cinf (Cgt). That is, the loss calculation unit 205 determines, for each set of positionally corresponding elements in Cinf and Cgt, a "square value of a difference among values of the elements in the set," and determines, as Loss$_C$, an average value of square values determined with respect to all the sets. In a case where a value of the output Cinf of the neural network deviates from a value of Cgt that is the GT map 704, a loss becomes large, and when the values of Cinf and Cgt approach to each other, a loss becomes small. Since the learning proceeds in a direction in which a loss becomes small, as the learning proceeds, the output of the neural network approaches to Cgt.

For instance, in the map 713, an element corresponding to the center position of the person 702 is assumed to indicate a high value. In this case, since the element 705 corresponding to the center position of the person 702 in the corresponding GT map 704 indicates a high value, it is indicated that the GT and the inference result are close to each other with respect to the center position of the person 702, and in this case, the loss Loss$_C$ becomes small.

On the other hand, in the map 713, an element corresponding to the center position of the dog 703 is assumed to indicate a low value. In this case, since the element 706 corresponding to the center position of the dog 703 in the corresponding GT map 704 indicates a high value, it is indicated that there is a deviation between the GT and the inference result with respect to the center position of the dog 703, and in this case, the loss Loss$_C$ becomes large.

Note that an equation for determining a loss based on a difference between the inference result of the center position of the object and the GT is not limited to the above-described equation of the sum of squared error, and for instance, the loss may be determined by using a loss function such as cross-entropy.

Next, processing of determining a loss with respect to the size of the object will be explained. The loss calculation unit 205 determines a loss Loss$_S$ based on a difference between the above-described map $S_A$ and a corresponding GT map Sgt according to Equation 6 described below.

$$\text{Loss}_S = \frac{1}{N} \sum \delta (S_A - S_{gt})^2 \qquad \text{(Equation 6)}$$

$\Sigma$ represents determining a total with respect to all elements of $S_A$ (Sgt), and N represents the number of the elements of $S_A$ (Sgt). In addition, $\delta( )$ is a function that returns 1 with respect to an element in which the object exists, among the respective elements of the map, and that returns 0 with respect to an element in which the object does not exist, among the respective elements of the map.

Since as values of the map $S_A$ and the GT map Sgt become closer to each other, a value of Loss$_S$ becomes small, as the learning proceeds, the map $S_A$ approaches to the GT map Sgt, and the size of the object can be inferred more accurately.

Note that an equation for determining a loss based on a difference between the map $S_A$ and the GT map Sgt is not limited to the above-described equation of the sum of squared error, and may be, for instance, an equation using an L1 error or a Smooth L1 error.

In this way, comparison between the map $S_A$ and the GT map Sgt is performed, and accordingly, the learning can be performed in consideration of the ensemble integration. As a result, inference accuracy for the object size subjected to the ensemble integration improves.

Next, processing of determining a loss with respect to the category of the object will be explained. The loss calculation unit 205 determines a loss $Loss_O$ based on a difference between the above-described map $O_A$ and a corresponding GT map Ogt according to Equation 7 described below.

$$Loss_O = \frac{1}{N} \sum \delta(O_A - O_{gt})^2 \qquad \text{(Equation 7)}$$

$\Sigma$ represents determining a total with respect to all elements of $O_A$ (Ogt), and N represents the number of the elements of $O_A$ (Ogt). In addition, $\delta()$ is a function that returns 1 with respect to an element in which the object exists, among the respective elements of the map, and that returns 0 with respect to an element in which the object does not exist, among the respective elements of the map.

Then, the loss calculation unit 205 determines, as a loss Loss in the neural network, a linear sum of the above-described three losses $Loss_C$, $Loss_S$ and $Loss_O$ as indicated by Equation 8 described below.

$$Loss = \alpha Loss_C + \beta Loss_S + \gamma Loss_O \qquad \text{(Equation 8)}$$

Here, $\alpha$, $\beta$ and $\gamma$ are hyper-parameters at the time of learning, and are empirically defined.

At step S306, an updating unit 206 performs learning of the neural network by updating a parameter of the neural network to make the loss Loss determined at step S305 smaller. The parameter of the neural network includes two types of parameters of a weight of an element such as Convolution and a weight with respect to neural network architecture, and both the parameters are updated. The updating of the parameters is performed based on Back Propagation by using Momentum SGD or the like.

Note that although calculation of a loss with respect to a single image is explained above, in actual learning, a loss is calculated with respect to a plurality of different images. Then, the parameters of the neural network are updated such that any loss determined with respect to the plurality of images becomes smaller than a threshold value.

At step S308, the updating unit 206 determines whether or not a learning end condition has been satisfied. Here, in a case where Loss becomes smaller than the threshold value, it is determined that the "learning end condition has been satisfied." Note that the learning end condition is not limited to a specific condition. For instance, in a case where a difference between the previous Loss and the current Loss (a change amount of Loss) has become less than a threshold value, it may be determined that the "learning end condition has been satisfied." In addition, for instance, in a case where the number of times of learning (the number of times of repetition of steps S301 to S306) has exceeded a threshold value, it may be determined that the "learning end condition has been satisfied." In addition, two or more conditions are combined, and in a case where all or any one of the conditions have been satisfied, it may be determined that the "learning end condition has been satisfied."

As a result of such determination, in a case where the learning end condition has been satisfied, the processing proceeds to step S309, and in a case where the learning end condition has not been satisfied, the processing proceeds to step S303.

At step S309, the updating unit 206 stores, in a storage unit 207, the parameters of the neural network learned by the above-described processing. The storage unit 207 may be identical to the above-described storage unit 104, or may be other storage unit that the information processing apparatus 1 has, or may be an external apparatus communicably connected to the information processing apparatus 1 via the I/F 105.

Next, an information processing apparatus 2 that infers an attribute (position, size, category) of an object in an input image by using the neural network learned by the information processing apparatus 1 will be explained. The information processing apparatus 2 may be an apparatus identical to the information processing apparatus 1, or may be a separate apparatus from the information processing apparatus 1.

A hardware configuration of the information processing apparatus 2 may be the configuration illustrated in FIG. 1 as with the information processing apparatus 1, or may be other configuration. In a case where the configuration of FIG. 1 is applied to the information processing apparatus 2, a CPU 101 executes various kinds of processing by using a computer program and data stored in a ROM 102 or a RAM 103. Accordingly, the CPU 101 entirely performs operation control of the information processing apparatus 2, and also executes or controls various kinds of processing explained as processing to be performed by the information processing apparatus 2. In addition, in the ROM 102, setting data of the information processing apparatus 2, a computer program and data relating to activation of the information processing apparatus 2, a computer program and data relating to a basic operation of the information processing apparatus 2, and the like are stored. In a storage unit 104, an operating system (OS), a computer program and data for causing the CPU 101 to execute or control various kinds of processing explained as processing to be performed by the information processing apparatus 2, and the like are saved. Other components are similar to those of the information processing apparatus 1.

A functional configuration example of the information processing apparatus 2 is illustrated in FIG. 8. In the present embodiment, it is assumed that each functional unit of FIG. 8 is implemented by software (computer program). Although the functional units of FIG. 8 may be explained below as main units of processing, functions of the functional units are actually realized by the CPU 101 executing computer programs corresponding to the functional units. Note that the functional units illustrated in FIG. 8 may be implemented by hardware. "Inference processing (object detection task) of inferring an attribute of an object in an input image" performed in such an information processing apparatus 2 will be explained with reference to a flowchart of FIG. 9.

At step S901, an image acquisition unit 801 acquires an input image including an object to be detected. As with step S301 described above, it is assumed here that the object to be detected includes a person and a dog, but the object to be detected is not limited thereto. In addition, a method of acquiring an input image is not limited to a specific acquisition method. To provide specific explanation here, the case where the image acquisition unit 801 has acquired an input image 701 at step S901 will be explained.

At step S902, an inference unit 802 first reads out the parameters of the neural network stored in the storage unit 207. Then, the inference unit 802 constructs a neural network (a neural network learned by processing according to the flowchart of FIG. 3), based on the parameters read out. Then, the inference unit 802 inputs the input image 701 to the neural network constructed, and performs operation processing of the neural network. Accordingly, as with step S303 described above, the inference unit 802 acquires maps exemplified in FIGS. 7F, 7G, 7H, 7I, 7J and 7K, as an output of the neural network (an inference result relating to the object to be detected). Although the processing relating to the person will be explained below, the processing is similarly performed with respect to the dog.

At step S903, an integration unit 803 performs processing according to Equation 1, Equation 2, Equation 2-1 described above, by using the maps 715 and 719 acquired at step S902, and thus, the integration unit 803 acquires a map $S_A$ as an inference result of a size of the object. In addition, the integration unit 803 performs processing according to Equation 3, Equation 4 described above, by using the maps 717 and 720 acquired at step S902, and thus, the integration unit 803 acquires a map $O_A$ as an inference result of a category of the object. That is, the image acquisition unit 801, the inference unit 802, and the integration unit 803 illustrated in FIG. 8 operate as with the image acquisition unit 201, the inference unit 203, and the integration unit 204 illustrated in FIG. 2, respectively.

At step S904, a post-processing unit 804 identifies, as a target element, an element having a value not less than a threshold value among elements in the map 713, and identifies a value of an element (the size of the object) positionally corresponding to the target element in the map $S_A$.

At step S905, the post-processing unit 804 performs Non-Maximum Suppression (NMS) processing with respect to frames (object detection frames) having the respective object sizes identified at step S904, and acquires a single frame as a detection frame of the object. For instance, the map 715 is assumed to be the map $S_A$. In this case, the Non-Maximum Suppression (NMS) processing is performed with respect to a plurality of frames 716 for the person 702 in the map 715, and a single frame is acquired as a detection frame of the person 702. Similar processing is also performed with respect to a plurality of frames for the dog 703, and a detection frame of the dog 703 is acquired.

In addition, the post-processing unit 804 identifies an element having a larger value between an element positionally corresponding to the target element in the map $O_A$ determined with respect to the person, and an element positionally corresponding to the target element in the map $O_A$ determined with respect to the dog. Then, the post-processing unit 804 acquires, as a detection category of the object, a category corresponding to the map to which the identified element belongs.

Then, the post-processing unit 804 outputs a detection position of the object (a center position of the detection frame, a position of any one of four corners of the detection frame, or the like), a size (height and width) of the detection frame of the object, and the detection category of the object, as an attribute inferred with respect to the object. An output destination of the attribute of the object is not limited to a specific output destination, and, for instance, the attribute may be displayed on a screen (not illustrated) that the information processing apparatus 2 has, or may be transmitted to an external apparatus via an I/F 105. In addition, the information processing apparatus 2 may perform further processing by using the attribute of the object.

In this way, according to the present embodiment, a weight with respect to an inference result of an attribute of an object is learned as a two-dimensional feature map, and accordingly, an ensemble can be obtained stably without depending on the number of detected candidates.

Modification 1 of First Embodiment

In each modification and each embodiment described below that include the present modification, a difference from the first embodiment will be explained, and unless otherwise specified below, the modifications and the embodiments are assumed to be similar to the first embodiment. In the present modification, in addition to the maps exemplified in FIGS. 7F, 7G and 7J, a map 1406 exemplified in FIG. 14B and a corresponding weighting map are also acquired. The map 1406 indicates a size of an object, as with the map of FIG. 7G. However, a value of each element of the map 1406 does not indicate a width and a height of a frame as in FIG. 7G, but indicates, as illustrated in FIG. 14A, distances 1402, 1403, 1404, 1405 from the element to an upper end, a lower end, a left end and a right end of a region of the object, respectively. A map 1401 of FIG. 14A is a GT map corresponding to the map 1406. Each element (each rectangle) in the maps of FIGS. 14A and 14B corresponds to each pixel or each image region in the input image.

In the present modification, at step S302, the inference unit 203 acquires, in addition to the maps exemplified in FIGS. 7F, 7G and 7J, the map 1406 exemplified in FIG. 14B, and a corresponding weighting map from the neural network having received the input image 701. Then, at step S304, the integration unit 204 determines as described below an element product of: a map of a size (width, height) of the object; and a weighting map corresponding to the map.

$$W1 = W \cdot A_{W1}$$

$$H1 = H \cdot A_{H1}$$

Here, W is a map in which only a value of the width (one of attribute elements "height, width" constituting an attribute "size") is employed in a value (height, width) of each element of the map of the size of the object. In addition, $A_{W1}$ is a map in which only a weight with respect to the width is employed in a value (a weight with respect to each of the height and the width) of each element of the weighting map $A_S$. In addition, H is a map in which only a value of the height (one of the attribute elements "height, width" constituting the attribute "size") is employed in a value (height, width) of each element of the map of the size of the object. In addition, Ami is a map in which only a weight with respect to the height is employed in a value (a weight with respect to each of the height and the width) of each element of the weighting map $A_S$.

In addition, the integration unit 204 determines as described below an element product of: a map indicating the distances from each element to the upper, lower, left and right ends, respectively (the map is a map such as the map 1406 described above, and will be referred to below as an upper-, lower-, left- and right-end map); and a weighting map corresponding to the map.

$$W2 = (L+R) \cdot A_{W2}$$

$$H2 = (T+B) \cdot A_{H2}$$

Here, L is a map in which, in a value of each element of the upper-, lower-, left- and right-end map (the distance from the element to each of the upper end, the lower end, the left end and the right end), only a value of the "distance from the element to the left end" is employed. R is a map in which, in a value of each element of the upper-, lower-, left- and right-end map, only a value of the "distance from the element to the right end" is employed, and T is a map in which, in a value of each element of the upper-, lower-, left- and right-end map, only a value of the "distance from the element to the upper end" is employed. In addition, B is a map in which, in a value of each element of the upper-, lower-, left- and right-end map, only a value of the "distance from the element to the lower end" is employed. In addition, $A_{W2}$ is a weighting map with respect to a map obtained by an element sum of the map L and the map R, and $A_{H2}$ is a weighting map with respect to a map obtained by an element sum of the map T and the map B. Then, the integration unit 204 defines the map S' of the size of the object, as described below.

$$S'=((W1+W2)/2, (H1+H2)/2)$$

This means that each element of the map S' has a value of each element in a map determined by (W1+W2)/2, and a value of each element in a map determined by (H1+H2)/2.

In this way, based on a map obtained by an element product of: a map for each channel of an attribute of the object in the input image; and a map representing a weight relating to the attribute of each region in the input image, a map of an attribute of the object in the input image is constituted.

Then, the map $S_A$ is determined from such a map S' as with the first embodiment, and the map $O_A$ is further determined as with the first embodiment. Then, the processing subsequently proceeds as with the first embodiment. Note that at steps S902 and S903, the inference unit 802 and the integration unit 803 perform processing similar to those performed by the inference unit 203 and the integration unit 204 described above, respectively.

In this way, in the present modification, not only the ensemble in the spatial direction explained in the first embodiment, but also an ensemble in a channel direction of a plurality of inference results different in quality are obtained. An ensemble is obtained by using a two or higher-dimensional feature vector with respect to not only the spatial direction but also the channel direction, and accordingly, accuracy of ensemble integration can be improved.

Modification 2 of First Embodiment

In the first embodiment, the map obtained by determining an element product of the maps by Equation 1 and Equation 3, and performing the spatial average processing by Equation 2 and Equation 4 with respect to the map obtained by the element product is acquired as the ensemble integration result with respect to the map of the attribute of the object. However, the acquisition method of the ensemble integration result is not limited to the acquisition method explained in the first embodiment. For instance, when the map S of the size of the object is taken as an example to explain, the map S' may be determined by using, instead of Equation 1, Equation 9 described below.

$$S'=\delta \cdot S \cdot A_S \qquad \text{(Equation 9)}$$

Here, $\delta$ is a map in which a value of an element is a binary of 1 or 0. When a value of an element of interest in the map $A_S$ is not less than a threshold value, a value of an element of a map $\delta$ corresponding to the element of interest is 1, and when the value of the element of interest in the map $A_S$ is less than the threshold value, the value of the element of the map $\delta$ corresponding to the element of interest is 0. That is, Equation 9 represents an element product of: a binarized map obtained by binarizing the weighting map $A_S$; and the map S. In addition, as indicated by Equation 10 described below, a map obtained by non-linearly converting a weighting map may be weighted again, and may be used as a map to determine the map S'.

$$S' = \frac{\exp(-A_S)}{\sum_{i \in peripheral} \exp\left(-A_S^i\right)} \circ S \qquad \text{(Equation 10)}$$

Here, "i∈Peripheral" represents an index of a defined number of elements including an i-th element and elements on a periphery of the i-th element. In addition, $S_A'$ may be determined by using, instead of the spatial average of Equation 2-1, a function of Equation 11 described below.

$$S_A^i=\max (S'_i) \qquad \text{(Equation 11)}$$

Here, max $(S'_i)$ is a function that returns a maximum value among a value of the i-th element and values of the respective elements on a periphery of the i-th element in the map S'. In addition, $S_A'$ may be determined by using, instead of the spatial average of Equation 2-1, a function of Equation 12 described below.

$$S_A^i=\text{median} (S'_i) \qquad \text{(Equation 12)}$$

Here, median $(S'_i)$ is a function that returns a median value among the value of the i-th element and the values of the respective elements on a periphery of the i-th element in the map S'.

Second Embodiment

In the present embodiment, learning of architecture of a neural network for performing an object tracking task of detecting a specific tracking target from an input image will be explained first. Processing to be performed by an information processing apparatus 1 to perform such learning will be explained with reference to a flowchart of FIG. 10.

At step S1001, an image acquisition unit 201 acquires, as a template image, an image in which a tracking target exists. In addition, a GT acquisition unit 202 acquires, as GT, an attribute such as a position and a size of the tracking target in the template image. An example of the template image is illustrated in FIG. 11A. A template image 1101 includes a tracking target 1103, and GT is, for instance, a position and a size of a rectangular region 1104 including the tracking target 1103.

At step S1002, the image acquisition unit 201 extracts a partial image including the tracking target from the template image, based on the position and the size indicated by the GT, and resizes the extracted partial image to have an appropriate size (for instance, a size of the template image). In the example of FIG. 11A, an image in a rectangular region 1102 obtained by enlarging by a constant multiple the rectangular region 1104 having the position and the size indicated by the GT in the template image 1101 is extracted as the partial image.

At step S1004, the image acquisition unit 201 acquires, as a search image, another image that is different from the image acquired at step S1001 and that includes the tracking target described above. For instance, the image acquisition unit 201 acquires, as the search image, an image of a frame different from a frame of the image acquired at step S1001 in an image sequence to which the image acquired at step S1001 belongs. An example of the search image is illustrated in FIG. 11B. A search image 1105 includes the tracking target 1103.

At step S1005, the image acquisition unit 201 extracts a partial image from the search image, based on the position and the size indicated by the GT, and resizes the extracted partial image to have an appropriate size (for instance, a size of the search image). In the example of FIG. 11B, an image in a rectangular region 1106 obtained by enlarging by a constant multiple a rectangular region having the position and the size indicated by the GT in the search image 1105 is extracted as the partial image.

At step S1003, an inference unit 203 inputs the partial image (first partial image) resized at step S1002 to a neural network and performs operation processing of the neural network, and thus, the inference unit 203 acquires characteristics of the tracking target in the first partial image.

At step S1006, the inference unit 203 inputs the partial image (second partial image) resized at step S1005 to the neural network and performs operation processing of the neural network, and thus, the inference unit 203 acquires characteristics of the tracking target in the second partial image.

At step S1007, the inference unit 203 determines a cross-correlation between the characteristics acquired at step S1003 and the characteristics acquired at step S1006, and identifies (infers) a position and a size of a region of characteristics similar to (highly correlating to) the characteristics of the tracking target in the search image. Then, the inference unit 203 generates a map of the inferred position and a map of the inferred size that are similar to those in the first embodiment.

An element in the "map of the inferred position" corresponding to the position of the region of the characteristics similar to (highly correlating to) the characteristics of the tracking target in the search image holds a value representing likelihood of a center position of the tracking target, for instance, a value of a correlation determined with respect to the characteristics. In addition, an element in the "map of the inferred size" corresponding to the position of the region of the characteristics similar to (highly correlating to) the characteristics of the tracking target in the search image holds the size of the region.

An example of the maps based on the cross-correlation determined at step S1007 is illustrated in FIG. 12. FIG. 12A illustrates a map 1201 indicating a center position of the tracking target, and the center position of the tracking target is inferred in the search image. An element 1202 in the map 1201 corresponds to the center position of the tracking target, and learning proceeds such that the inferred center position corresponds to the element 1202.

FIG. 12B illustrates a map 1204 indicating a size of the tracking target, and the size of the tracking target is inferred in the search image, and a map 1207 of FIG. 12C is a weighting map with respect to the map 1204, and as with the first embodiment, the map 1207 is obtained as an output from the neural network. A value of each element in the map 1207 is a weight with respect to a size of an object corresponding to the element.

Then, as with the first embodiment, processing of steps S304 to S306 is subsequently performed to update a parameter of the neural network, and thus, learning processing of the neural network is performed. Then, as with the first embodiment, such learning processing is repeated, and in a case where a learning end condition has been satisfied, the processing proceeds via step S308 to step S309, and the parameter of the neural network is stored in a storage unit 207.

Figure 10:
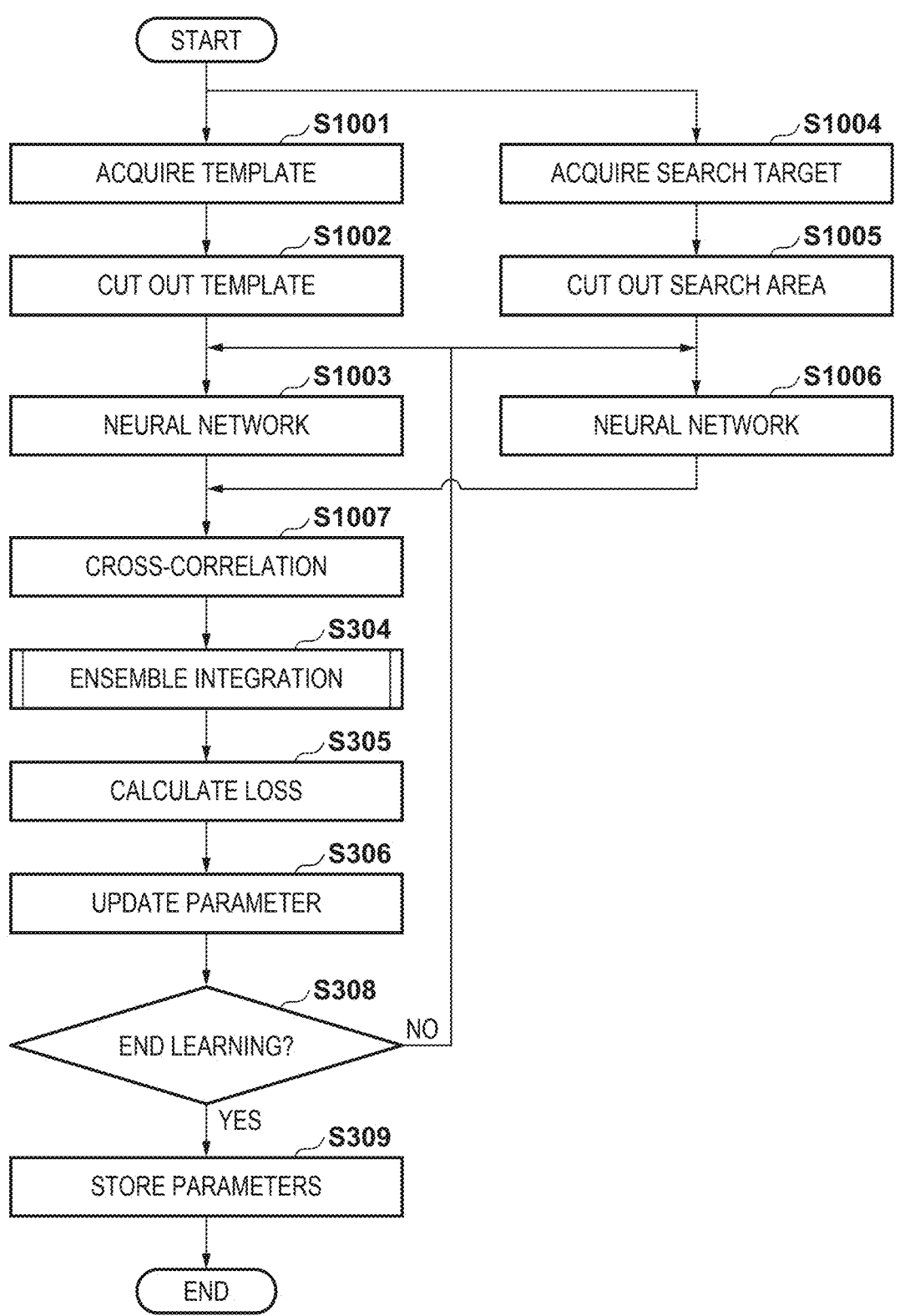
FIG. 10 is a flowchart of processing to be performed by the information processing apparatus 1.

Next, processing to be performed by an information processing apparatus 2 to perform an object tracking task of detecting a specific tracking target from an input image will be explained with reference to a flowchart of FIG. 13. In FIG. 13, processing steps similar to the processing steps illustrated in FIG. 10 are denoted by identical step numbers.

At step S1001, an image acquisition unit 801 acquires, as a template image, an image in which the tracking target exists. In addition, at step S1004, the image acquisition unit 801 acquires, as a search image, another image that is different from the image acquired at step S1001 and that includes the tracking target described above.

At step S1003, an inference unit 802 inputs the template image to a neural network and performs operation processing of the neural network, and thus, the inference unit 802 acquires characteristics of the tracking target in the template image.

At step S1006, the inference unit 802 inputs the search image to the neural network and performs operation processing of the neural network, and thus, the inference unit 802 acquires characteristics of the tracking target in the search image.

At step S1007, the inference unit 802 determines a cross-correlation between the characteristics acquired at step S1003 and the characteristics acquired at step S1006, and identifies (infers) a position and a size of a region of characteristics similar to (highly correlating to) the characteristics of the tracking target in the search image. Then, the inference unit 203 generates a map of the inferred position and a map of the inferred size that are similar to those in the first embodiment.

At step S304, an integration unit 803 performs processing by using the map of the inferred size, as with the first embodiment, and thus, the integration unit 803 acquires a map that is an inference result of the size of the tracking target in the search image.

At step S1301, a post-processing unit 804 performs processing similar to those at steps S904 and S905 described above, by using the map of the inferred position of the tracking object and the map of the size acquired at step S304, and thus, the post-processing unit 804 acquires an attribute of the object.

In this way, in the present embodiment, an ensemble integration weight is learned as illustrated in FIG. 12C, and accordingly, learning proceeds such that while a value of an ensemble integration weight becomes high on a periphery of the tracking target, a value of an ensemble integration weight on a periphery of a non-tracking target becomes low. This is because, since an object size obtained on a periphery of the non-tracking target is different from an object size of the tracking target, when the object size of the non-tracking target is used to obtain an ensemble, an error of the inferred size of the tracking target becomes large. As a result, an ensemble weight on a periphery of the non-tracking target becomes low. Therefore, even in a case where a non-tracking target exists on a periphery of a tracking target, or even in a case where a portion of a tracking target is hidden by a non-tracking target, it becomes easy to stably obtain an ensemble, and size inference accuracy of a tracking target improves.

Although the operations of the information processing apparatus 1 and the information processing apparatus 2 are explained by giving specific examples in each embodiment and each modification described above, the operations of those apparatuses are not limited to the above-described examples. For instance, the operation of the information processing apparatus 1 described above is an example of an operation of inferring (first inference) an attribute of an object in an input image, and a weight relating to the attribute of each region in the input image, and inferring (second inference) an attribute of the object, based on the attribute and the weight that are inferred in the first inference.

In addition, for instance, the operation of the information processing apparatus 2 described above is an example of an operation of acquiring (first acquisition), as an output of a neural network having received an input image, an attribute of an object in the input image, and a weight relating to the attribute of each region in the input image, and updating a parameter of the neural network, based on the attribute and the weight that are acquired by the first acquisition and based on supervised data.

In addition, a numerical value, processing timing, order of processing, a main unit of processing, a transmission destination/transmission source/storage location of data (information) and the like that are used in each embodiment and each modification described above are given as an example to provide specific explanation, and are not intended to be limited to such an example.

In addition, a portion or all of the respective embodiments and the respective modifications explained above may be used in combination as appropriate. In addition, a portion or all of the respective embodiments and the respective modifications explained above may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-206258, filed Dec. 20, 2021, which is hereby incorporated by reference herein in its entirety.

What is claimed is:

1. An information processing apparatus comprising:
at least one processor; and
at least one memory having stored thereon instructions which, when executed by the at least one processor, cause the information processing apparatus at least to:
infer an attribute map of an object in an input image, and a weight map for the attribute map, wherein the weight map includes a plurality of weights for a plurality of regions in the input image; and infer an attribute of the object, based on the attribute map and the weight map inferred,
wherein the attribute map of the object in the input image is obtained based on a cross-correlation between characteristics of the object in the input image and characteristics in an image different from the input image.

2. The information processing apparatus according to claim 1, wherein the at least one processor is further caused to:
determine, as the attribute map and the weight map, an output of a neural network having received the input image.

3. The information processing apparatus according to claim 1, wherein the at least one processor is further caused to: infer the attribute of the object, based on a map obtained by an element product of: the attribute map of the object in the input image; and the weight map for the attribute map.

4. The information processing apparatus according to claim 1, wherein the at least one processor is further caused to: infer the attribute of the object, based on a map obtained by an element product of: a map for each channel of an attribute of the object in the input image; and the weight map for the attribute map.

5. The information processing apparatus according to claim 1, wherein the at least one processor is further caused to: infer the attribute of the object, based on a map obtained by an element product of: the attribute map of the object in the input image; and a binarized map obtained by binarizing the weight map for the attribute map.

6. The information processing apparatus according to claim 1, wherein the at least one processor is further caused to: infer the attribute of the object, based on a map obtained by an element product of: the attribute map of the object in the input image; and a map obtained by non-linearly converting the weight map for the attribute map.

7. The information processing apparatus according to claim 3, wherein the at least one processor is further caused to: infer the attribute of the object by using a map obtained by, for each element of the map obtained by the element product, averaging a value of the element and values of elements on a periphery of that element.

8. The information processing apparatus according to claim 3, wherein the at least one processor is further caused to; infer the attribute of the object by using a map in which a value corresponding to each element of the map obtained by the element product becomes a maximum value among a value of the element and values of elements on a periphery of that element.

9. The information processing apparatus according to claim 3, wherein the at least one processor is further caused to: infer the attribute of the object by using a map in which a value corresponding to each element of the map obtained by the element product becomes a median value among a value of the element and values of elements on a periphery of that element.

10. An information processing method comprising:
inferring an attribute map of an object in an input image, and a weight map for the attribute map, wherein the weight map includes a plurality of weights for a plurality of regions in the input image; and
inferring an attribute of the object, based on the attribute map and the weight map inferred,
wherein the attribute map of the object in the input image is obtained based on a cross-correlation between characteristics of the object in the input image and characteristics in an image different from the input image.

11. A non-transitory computer-readable storage medium storing a computer program for causing a computer to function as:

a first inference unit configured to infer an attribute map of an object in an input image, and a weight map for the attribute map, wherein the weight map includes a plurality of weights for a plurality of regions in the input image; and a second inference unit configured to infer an attribute of the object, based on the attribute map and the weight map inferred by the first inference unit, wherein the attribute map of the object in the input image is obtained based on a cross-correlation between characteristics of the object in the input image and characteristics in an image different from the input image.

12. The information processing apparatus according to claim 1, wherein the attribute is one of a size of the object, a position of the object, or a category of the object.

13. The information processing apparatus according to claim 1, wherein each region in the input image is an image region constituted by two or more pixels.

14. The information processing apparatus according to claim 2, wherein parameters of the neural network of the information processing apparatus are learned based on a difference between the attribute inferred based on the attribute map and the weight map, and a Ground Truth of the attribute.

15. The information processing apparatus according to claim 1, wherein the information processing apparatus infers the attribute based on a map obtained by an element product of: a plurality of maps having a common attribute; and the weight map for the attribute map.

16. The information processing apparatus according to claim 1, wherein the attribute map includes a center-position likelihood map indicating a likelihood that each region corresponds to a center position of the object and a size map indicating a size of the object, and wherein the at least one processor is further caused to determine a bounding box of the object in the input image based on a region selected using the center-position likelihood map and a size value at a position corresponding to the selected region in the size map.

\* \* \* \* \*